United States Patent [19]

Wu

[11] Patent Number: 5,724,703
[45] Date of Patent: Mar. 10, 1998

[54] POSITIONING DEVICE FOR POSITIONING A MAT IN A CAR

[76] Inventor: Sheng-Ho Wu, No. 7, Fu-Chiang Rd., Kuan-Tien Hsiang, Tainan Hsien, Taiwan

[21] Appl. No.: 775,405

[22] Filed: Dec. 31, 1996

[51] Int. Cl.[6] .................................................. A47G 27/04
[52] U.S. Cl. ........................................................... 16/4
[58] Field of Search ............................... 16/4, 5, 7, 8, 9, 16/16, 17.1; 293/97.23

[56] References Cited

U.S. PATENT DOCUMENTS

| 4,086,679 | 5/1978 | Butler | 296/97.23 |
| 5,148,581 | 9/1992 | Hartmann | 16/4 |

*Primary Examiner*—Chuck Mah
*Attorney, Agent, or Firm*—Fulwider Patton Lee & Utecht, LLP

[57] ABSTRACT

A positioning device for positioning a mat in a car includes an elongated clamping base, at least one spring unit and a hook unit. The clamping base is formed with at least one lower clamping unit and at least one upper clamping unit having a rear edge hinged to a corresponding lower clamping unit. The spring unit is provided on the clamping base for biasing the upper clamping unit toward the corresponding lower clamping unit. The hook unit has a first end connected to the clamping base and a second end adapted to be hooked at a desired position in the car. The upper and lower clamping units are adapted to clamp an edge portion of the mat therebetween. The spring unit ensures tight engagement between the upper and lower clamping units and the edge portion of the mat.

6 Claims, 4 Drawing Sheets

POSITIONING DEVICE FOR POSITIONING A MAT IN A CAR

BACKGROUND OF THE INVENTION

1. Field of the Invention

The present invention relates to a positioning device, more particularly to a positioning device for positioning a mat in a car.

2. Description of the Related Art

FIG. 1 illustrates a conventional mat used in a car. The mat has a bottom side provided with a plurality of protrusions to prevent sliding of the mat in the car. However, the protrusions cannot prevent sliding of the mat effectively. Sliding of the mat may result in great danger for the driver of the car, especially when the mat slides forwardly so as to affect operation of the brake or the accelerator of the car. It is thus desired to provide a positioning device for positioning the mat used in a car so as to prevent forward sliding of the mat.

SUMMARY OF THE INVENTION

The main object of the present invention is to provide a positioning device for positioning a mat in a car so as to prevent forward sliding of the mat.

Accordingly, the positioning device according to the present invention includes an elongated clamping base, at least one spring unit and a hook unit. The elongated clamping base is formed with at least one lower clamping unit and at least one upper clamping unit having a rear edge hinged to a corresponding lower clamping unit. The spring unit is provided on the clamping base for biasing the upper clamping unit toward the corresponding lower clamping unit. The hook unit has a first end connected to the clamping base and a second end adapted to be hooked at a desired position in the car. The upper and lower clamping units are adapted to clamp an edge portion of the mat therebetween. The spring unit ensures tight engagement between the upper and lower clamping units and the edge portion of the mat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
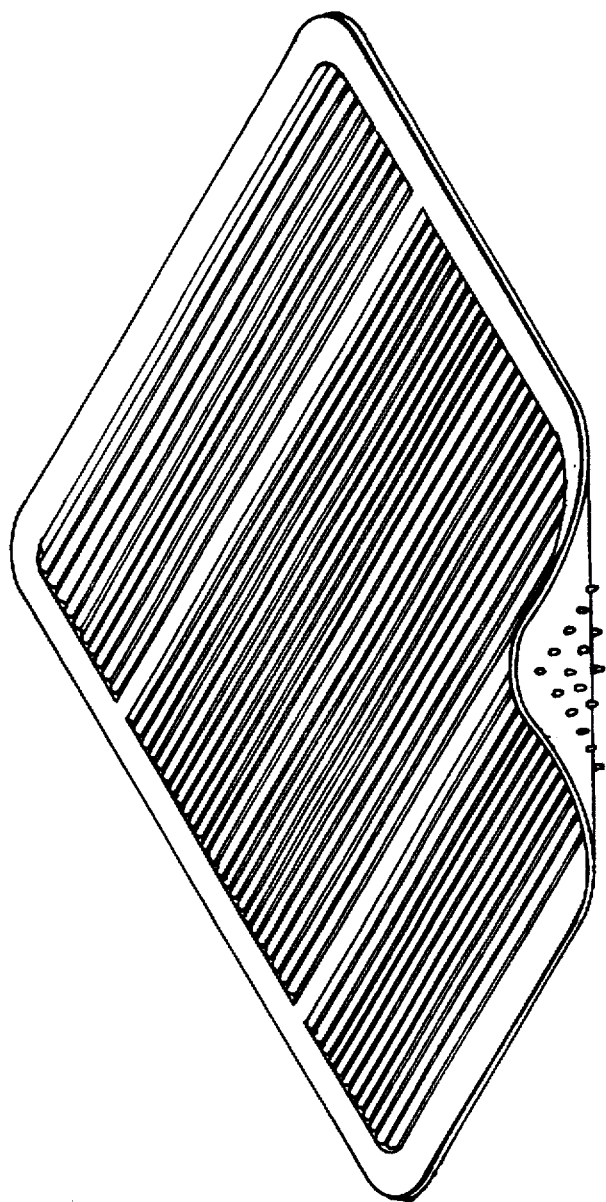
FIG. 1 is a perspective view illustrating a conventional mat used in a car.
Figure 2:
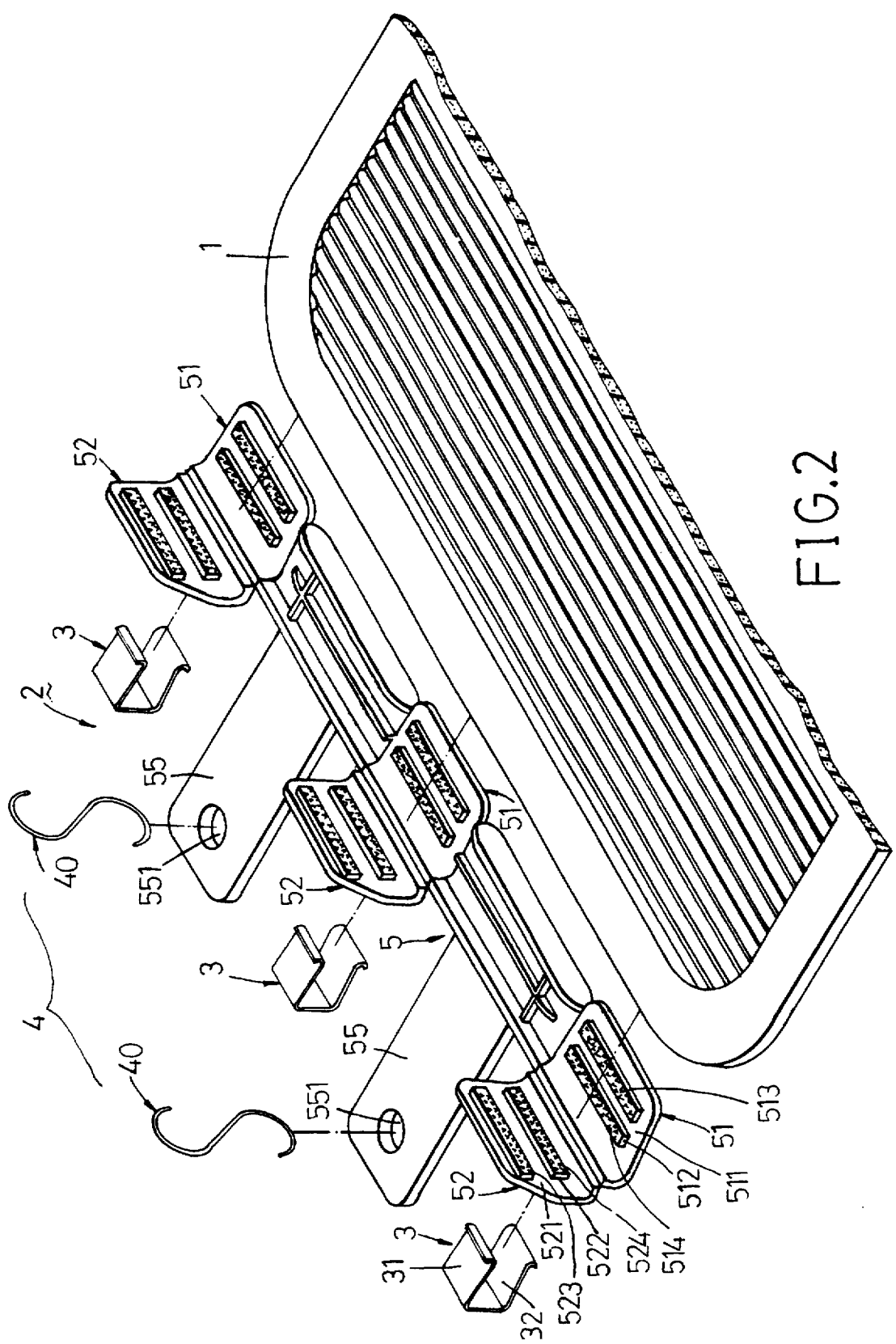
FIG. 2 is an exploded perspective view illustrating a positioning device according to a preferred embodiment of the present invention.
Figure 3:
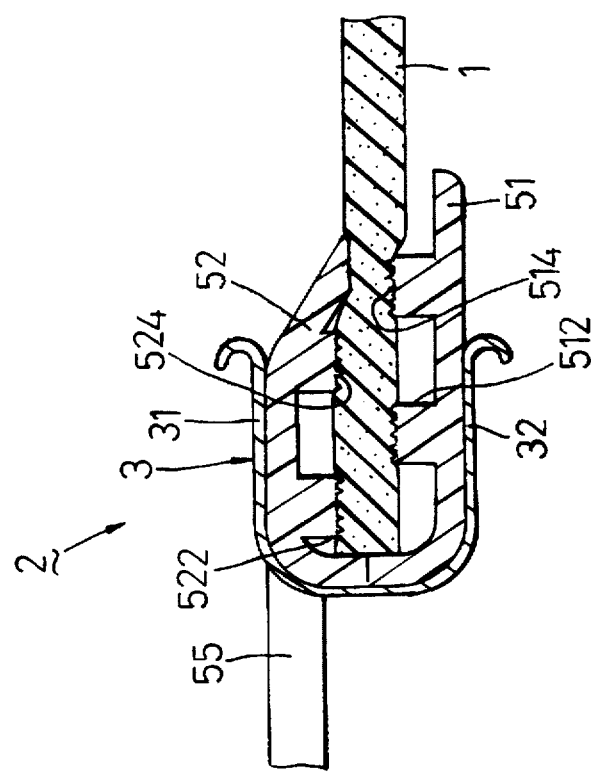
FIG. 3 is a cross-sectional view illustrating the positioning device of FIG. 2.

Referring to FIGS. 2 and 3, the positioning device 2 according to a preferred embodiment of the present invention is adapted to position a mat 1 at a desired position in a car. The positioning device 2 includes an elongated clamping base 5 formed with three lower clamping units 51 and three upper clamping units 52. Each of the upper clamping units 52 has a rear edge hinged to a corresponding lower clamping unit 51. Each of the upper clamping units 52 has an inner surface 521 formed with a parallel pair of spaced, longitudinally extending press strips 522. Each of the press strips 522 has a contact face 523 that is adapted to be in contact with a top side of the edge portion of the mat 1. The contact face 523 is formed with a plurality of protrusions 524. Each of the lower clamping units 51 has an inner surface 511 formed with a parallel pair of spaced, longitudinally extending press strips 512. The press strips 512 of the lower clamping units 51 are staggered with respect to the press strips 522 of the upper clamping unit 52. Each of the press strips 512 of the lower clamping unit 51 has a contact face 513 that is adapted to be in contact with a bottom side of the edge portion of the mat 1. The contact face 513 is formed with a plurality of protrusions 514. The protrusions 524, 514 of the upper and lower clamping units 52, 51 are provided for frictionally retaining the edge portion of the mat 1 between the upper and lower clamping units 52, 51.

The positioning device 2 further includes three spring units provided on the clamping base 5. In this embodiment, each of the spring units includes a substantially U-shaped clip 3 that has an upper wall 31 and a lower wall 32. The upper and lower clamping units 52, 51 are disposed between and are clamped by the upper and lower walls 31, 32 of the clip 3. The clip 3 is provided for biasing a respective upper clamping unit 52 toward the corresponding lower clamping unit 51 so as to ensure tight engagement between the upper and lower clamping units 52, 51 and the edge portion of the mat 1.

Figure 4:
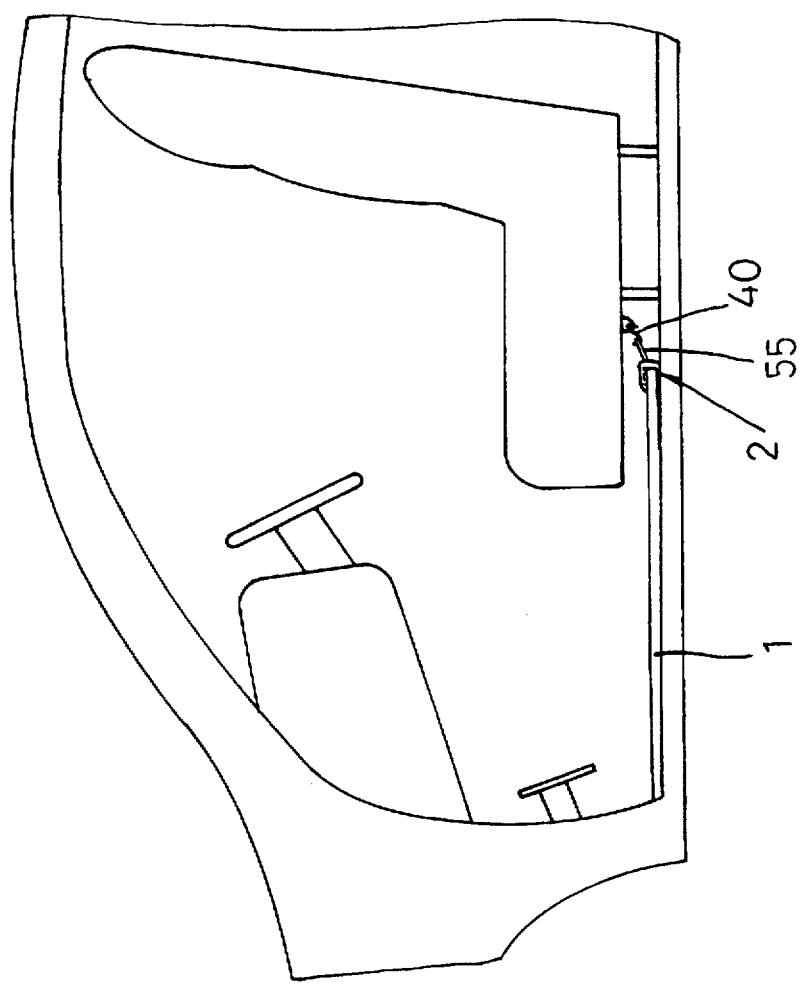
FIG. 4 illustrates how the positioning device can be used in a car so as to prevent forward sliding of a mat.

The clamping base 5 has a rear edge provided with a pair of extensions 55, each of which is formed with an engaging hole 551 therethrough. The positioning device 2 is further provided with a hook unit 4 that includes a pair of S-shaped hook members 40. Each of the hook members 40 has a first end extending through the engaging hole 551 to engage a respective extension 55 of the clamping base 5, and a second end adapted to be hooked at the desired position in a car, as shown in FIG. 4.

To use the positioning device 2, the edge portion of the mat 1 is disposed between the upper and lower clamping units 52, 51 of the clamping base 5. The upper and lower clamping units 52, 51 are subsequently clamped together by the clips 3. The clips 3, the staggered press strips 522, 512 provided on the upper and lower clamping units 52, 51, and the protrusions 524, 514 formed on the press strips 522, 512 cooperatively retain the edge portion of the mat 1 between the upper and lower clamping units 52, 51. Finally, one end of the S-shaped hook member 40 is passed through the respective engaging hole 551 to engage the respective extension 55 of the clamping base 5, while the other end of the hook member 40 is hooked at a desired position below a seat of the car. The mat 1 is thus positioned and prevented from sliding forwardly.

It should be noted that the clips 3 may be replaced by torsion springs in other embodiments of the positioning device of the present invention.

With this invention thus explained, it is apparent that numerous modifications and variations can be made without departing from the scope and spirit of this invention. It is therefore intended that this invention be limited only as indicated in the appended claims.

I claim:

1. A positioning device for positioning a mat in a car, said positioning device comprising:

an elongated clamping base formed with at least one lower clamping unit and at least one upper clamping unit having a rear edge hinged to a corresponding said lower clamping unit;

at least one spring unit provided on said clamping base for biasing said upper clamping unit toward the corresponding said lower clamping unit; and a hook unit having a first end connected to said clamping base and a second end adapted to be hooked at a desired position in the car;

whereby, said upper and lower clamping units are adapted to clamp an edge portion of the mat therebetween, said spring unit ensuring tight engagement between said upper and lower clamping units and the edge portion of the mat.

2. The positioning device according to claim 1, wherein said spring unit includes a substantially U-shaped clip that has an upper wall and a lower wall, said upper and lower clamping units being disposed between said upper and lower walls of said clip.

3. The positioning device according to claim 1, wherein at least one of said upper and lower clamping units has an inner surface formed with at least one longitudinally extending press strip.

4. The positioning device according to claim 3, wherein said press strip has a contact face that is adapted to be in contact with the edge portion of the mat, said contact face being formed with a plurality of protrusions for frictionally retaining the edge portion of the mat between said upper and lower clamping units.

5. The positioning device according to claim 3, wherein both of said upper and lower clamping units are formed with said press strips which are staggered with respect to each other.

6. The clamping device according to claim 1, wherein said clamping base has a rear edge provided with an extension that is formed with an engaging hole therethrough, said hook unit including an S-shaped hook member having a first end that extends through said engaging hole to engage said extension of said clamping base, and a second end adapted to be hooked at the desired position in the car.

* * * * *